(12) United States Patent
Li et al.

(10) Patent No.: US 8,515,280 B1
(45) Date of Patent: Aug. 20, 2013

(54) PHYSICALLY-DIVERSE ROUTING IN HETEROGENEOUS OPTICAL NETWORKS

(75) Inventors: Guangzhi Li, Madison, NJ (US); Angela Lan Chiu, Holmdel, NJ (US); Chris Dailey, Matthews, NC (US); Robert Duncan Doverspike, Tinton Falls, NJ (US); Monica Naukam Gerhardstein, Troy, MI (US); Dongmei Wang, Madison, NJ (US); Dahai Xu, Livingston, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 237 days.

(21) Appl. No.: 12/966,356

(22) Filed: Dec. 13, 2010

(51) Int. Cl.
*H04B 10/20* (2006.01)
*H04J 14/00* (2006.01)

(52) U.S. Cl.
USPC ............................................ 398/58; 398/57

(58) Field of Classification Search
USPC ................................................ 398/57, 58, 83
See application file for complete search history.

(56) References Cited

U.S. PATENT DOCUMENTS

| | | | |
|---|---|---|---|
| 2010/0142943 A1* | 6/2010 | Frankel et al. | 398/25 |
| 2011/0150470 A1* | 6/2011 | Jenkins et al. | 398/58 |

* cited by examiner

*Primary Examiner* — Dalzid Singh

(57) ABSTRACT

Systems and methods are described that provide a two-step, physically-diverse optical routing. A diverse routing is formulated using Integer Linear Programming (ILP) to find feasible routes having a minimum estimated cost, and post-processing the feasible routes on an auxiliary cost graph to optimize regenerator and terminal Optical Transponder (OT) placement and wavelength assignment.

23 Claims, 13 Drawing Sheets

FIG. 4
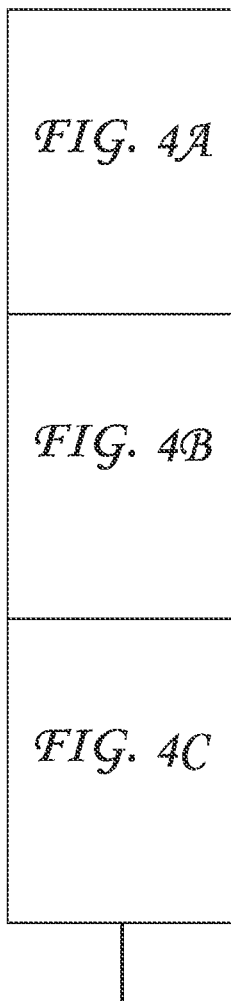
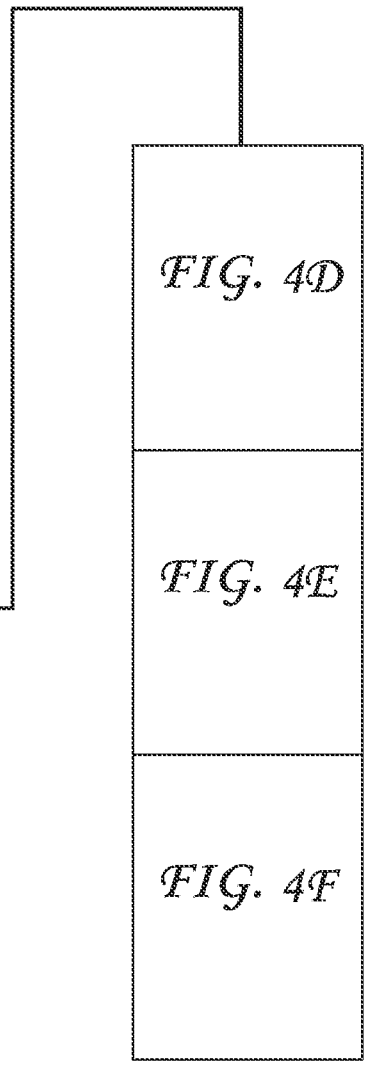

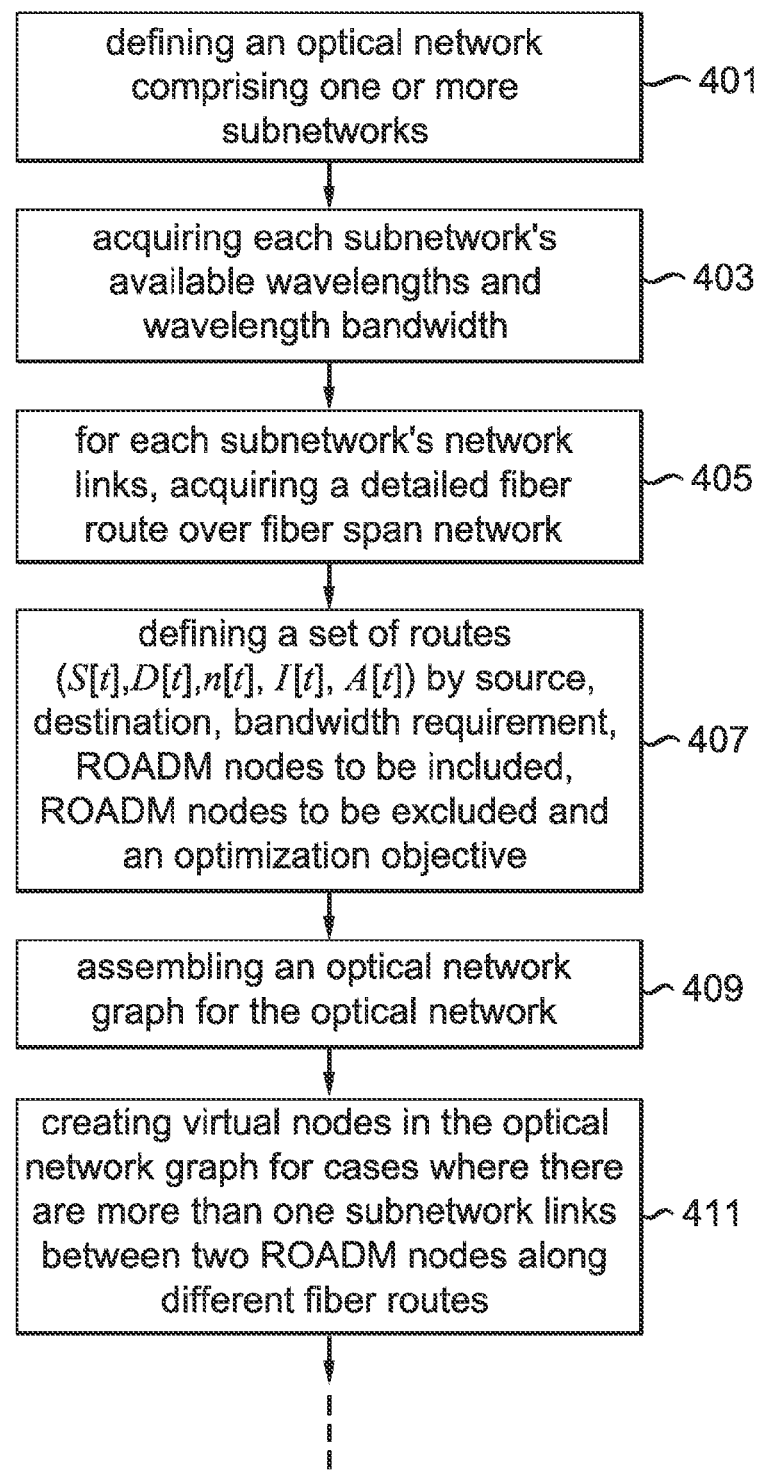

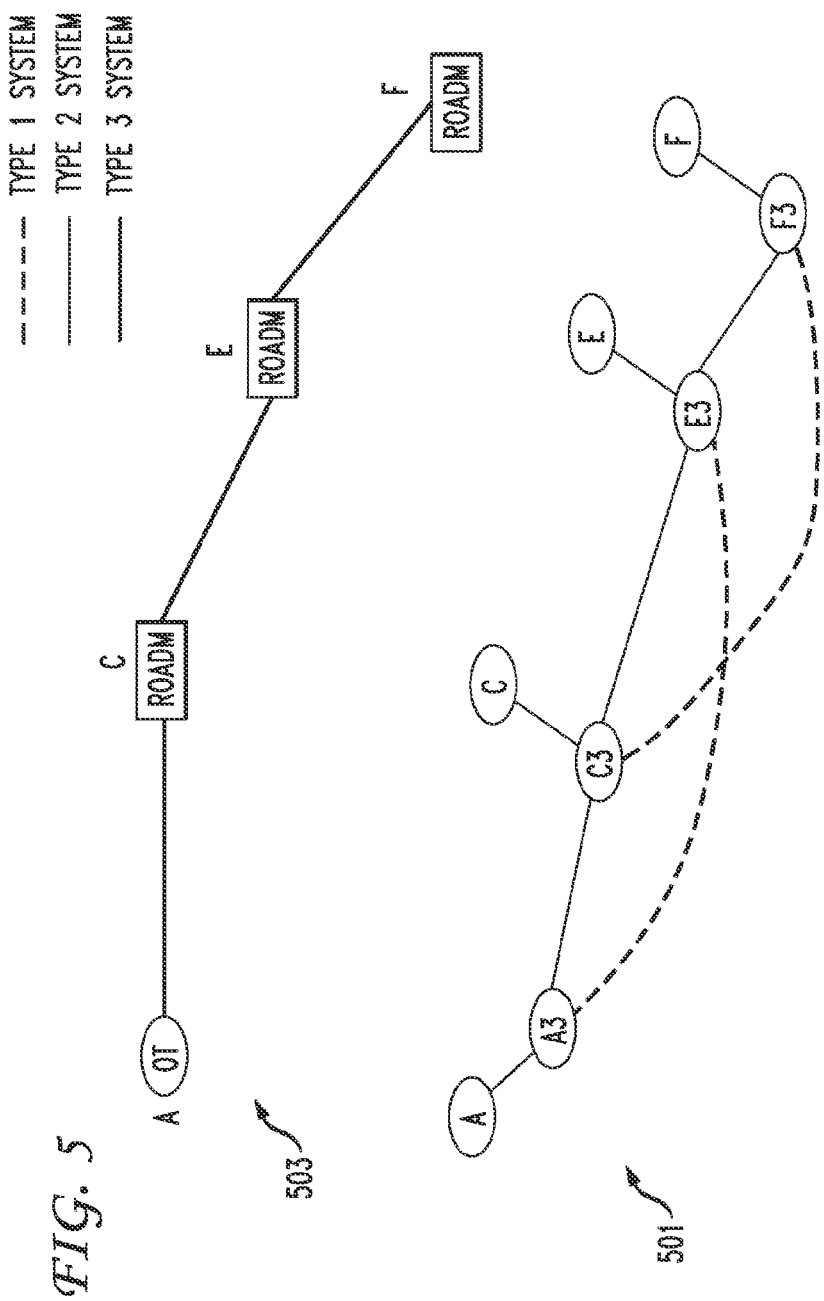

FIG. 7

| BE | Set of basic edges, i.e., optical network DWDM links |
|---|---|
| PE | Set of bypassing edges, i.e., optical network express links and multiplex links |
| EE[u,v] | Set of basic edges for the bypassing edge (u,v)∈PE |
| E | Full set of edges, i.e. BE∪PE |
| RV | Set of ROADM nodes |
| MV | Set of virtual nodes |
| JV | Set of fiber span network joint nodes |
| OL[u] | Set of adjacent nodes of node u |
| G | Set of SRLG |
| GE[g] | Set of basic edges in SRLG g |
| XG | set of extended SRLG |
| XE[g] | Set of bypassing edges using the extended SRLG, g∈XG. |
| FG | Full set of SRLG, i.e., G∪XG |
| FE[g] | Set of edges passing g∈FG |
| P[u] | Set of basic edges passing ROADM nodes u∈RV |
| VE[u] | Set of edges passing nodes U ∈ RV∪JV |
| D | Set of demands |
| A[t] | Set of nodes to be avoided for the $t$-$th$ connection |
| I[(t)] | Set of nodes to be included for the $t$-$th$ connection |
| x[t,u,v] | Binary variable to indicate if edge (u,v) is used in the t-th connection |
| y[t,g] | Binary variable to indicate if SRLG g∈FG is used in the t-th connection |
| z[t,u] | Variable for the label of vertex u in the t-th circuit |
| O[t,u] | Number of links containing vertex u in the t-th circuit |

PHYSICALLY-DIVERSE ROUTING IN HETEROGENEOUS OPTICAL NETWORKS

BACKGROUND OF THE INVENTION

The invention relates generally to network communications. More specifically, the invention relates to methods and systems that find diverse optical routes in multi-vendor networks with minimum total cost or minimal total distance.

With technology evolution and industry consolidation, a large carrier's core transport network may include several Dense Wavelength Division Multiplexer (DWDM) systems from different vendors using different technologies. A traditional point-to-point (unidirectional) DWDM system would employ one optical multiplexer, an optical fiber and one optical demultiplexer. The optical multiplexer can combine n wavelength signals together and transmit the multiplexed signal over the fiber to the demultiplexer. The demultiplexer decomposes the multiplexed signal back into n wavelength signals. Two electronic devices, such as routers, may be connected over a single wavelength.

FIG. 1 shows an exemplary point-to-point DWDM system 101 that comprises forwarding client routers $103_1$, $103_2$, ... $103_n$ (collectively 103) a forwarding terminal Optical Transponder (OT) 105, an optical multiplexer 107, an optical fiber 109, an optical demultiplexer 111, a receiving terminal OT 113 and receiving client routers $115_1$, $115_2$, ... $115_n$ (collectively 115). A forwarding router 103 transmits a client signal with a common short-reach wavelength $\lambda 0$. Before entering the optical multiplexer 107, the signal is converted into another wavelength $\lambda 1$ via the forwarding terminal OT 105. The $\lambda 1$ signal is combined with other wavelength signals $\lambda 2$, ..., $\lambda n$ and transmitted over the fiber 109 to the demultiplexer 111. The demultiplexer 111 decomposes the combined signal $\lambda 1$, $\lambda 2$, ..., $\lambda n$ back to their separate wavelengths. The $\lambda 1$ signal is converted into the common short-reach wavelength $\lambda 0$ by the receiving terminal OT 113 and the wavelength $\lambda 0$ may be received by a receiving client router 115.

A bidirectional DWDM communications system comprises two fibers—one fiber for each communication direction. The signal transmission of the return direction is similar. When a connection is switched from one DWDM system to another DWDM system, two OTs are needed. The first OT converts the first DWDM system wavelength into a common short-reach wavelength ($\lambda 0$) and the second OT converts the common short-reach wavelength ($\lambda 0$) into a second DWDM system wavelength.

However, when the two DWDM systems are of the same technology from the same vendor, one optical regenerator OT can be used to replace two back-to-back terminal OTs and avoid the conversion to an intermediate, common short-reach wavelength thereby reducing component cost. An optical regenerator OT is less expensive than two terminal OTs.

Reconfigurable Optical Add-Drop Multiplexer (ROADM) technologies for DWDM transports are being deployed due to their high capacity and capital savings. A ROADM network typically includes a set of multi-degree nodes connected via fibers to form a mesh topology. Traffic may be added or dropped, or expressed at ROADM nodes.

ROADMs are a form of optical add-drop multiplexer that adds the ability to remotely switch traffic from a DWDM system at the wavelength layer. This allows individual wavelengths carrying data channels to be added and dropped from a transport fiber without the need to convert the signals on all of the WDM channels to electronic signals, and back again to optical signals. The main advantages of ROADMs are the planning of the entire bandwidth assignment need not be carried out during initial deployment of a communications system, the configuration may be performed as and when required. ROADMs allow for remote configuration and reconfiguration.

From the perspective of the switch fabric, the terminal used to add and drop channels is that of a transmit/receive port. It employs tunable lasers and filters that allow any wavelength at a terminal/switch fabric interface to be routed to any terminal transmit/receive port. It also contains regenerator OTs that can perform wavelength translation.

Using ROADM systems, a wavelength connection or lightpath is able to travel a long distance such as 1500 km or more without requiring Optical to Electronic to Optical (OEO) regeneration. This distance limit is referred to as the optical-reach. A regenerator OT is needed when a connection length is longer than the optical-reach. An optical path without regeneration is called an express link.

Today, most ROADM based systems support OC-192 (10 Gbps) or OC-768 (40 Gbps) per wavelength. But a large portion of connections are still provisioned using lower speeds such as OC-48 (2.5 Gbps). A network carrier needs to be able to multiplex low speed connections into a high speed wavelength lightpath in a ROADM network where each low speed connection occupies one subchannel of the wavelength lightpath. For example, one OC-192 may comprise four OC-48 subchannels. A high speed wavelength lightpath with multiplexing capability is called a multiplex link.

In DWDM systems, optical signals are transmitted over fibers. Multiple fibers are combined together and deployed over a common conduit. The fiber conduits form a fiber map. In the fiber map, fiber nodes are ROADM sites and fiber joints, where fiber joints are fiber branch locations. Fiber segments between two neighbor fiber nodes are called fiber spans. DWDM systems are built upon fiber spans. In DWDM systems, the traffic add/drop/express through sites are called DWDM nodes, and fiber span connections between two DWDM nodes are called DWDM links. Multiple DWDM links may share the same fiber span, which are labeled a Shared Risk Link Group (SRLG) since a fiber span cut can affect all the DWDM links in the group.

In summary, optical networks can be decomposed into four layers: 1) a fiber span layer, 2) a DWDM link layer, 3) an express link layer and 4) a multiplexing link layer.

Network planners are often requested to provision multiple physically diverse optical routes with different source, different destination and different bandwidth requirements. For example, an enterprise customer may ask for an optical Virtual Private Network (VPN) connecting multiple operation sites, and that the optical VPN routes are physically diverse from each other for high network availability.

Physical diversity means no sharing of fiber spans, fiber joints, and other optical facilities among each route. This problem becomes more complicated due to heterogeneous optical networks' multiple layers and heterogeneous vendor systems.

Finding two SRLG diverse routes between two DWDM nodes is already non-deterministic polynomial-time (NP) hard (i.e. possibly no existence of any fast polynomial-time solution method). Therefore to find multiple SRLG diverse routes plus additional engineering constraints like bypassing or including/excluding DWDM nodes in routes is also NP-hard.

Currently there is no existing tool to solve this complicated problem and network planners often rely on their experiences and spread sheets to find feasible solutions.

What is desired is a method and system that finds multiple diverse optical routes with minimum total cost or total distance in heterogeneous multi-layer multi-vendor optical networks.

SUMMARY OF THE INVENTION

The inventors have discovered that it would be desirable to solve the optical diverse routing problem using a two-step method. In the first step, a diverse routing is formulated using Integer Linear Programming (ILP) to find feasible routes having a minimum estimated cost or distance. In the second step, the routes are post-processed on an auxiliary graph to optimize vendor system selection, regenerator OT placement and wavelength assignment.

The optical diverse routing problem is defined as, given a network configuration that includes multiple vendor domains, fiber spans for each DWDM link, the cost of DWDM system terminal OTs and regenerator OTs, available DWDM link capacity, DWDM system reachability, multiplexing capability and unused subchannels of the existing multiplexed lightpath, a set of connections (with source, destination, bandwidth, a list of nodes to be avoided and a list of nodes to be included) using the available wavelength/subchannels needs to be provisioned. Lightpaths in ROADM domains need to be set up such that those connections are physically diverse from each other and the total capital cost or the total distance is minimized. Total capital cost includes both common cost and terminal OT/regenerator OT cost. The common cost includes shared DWDM system cost, optical amplifier cost and fiber cost, and it is often modeled as the product of unit cost per distance and total distance. Different DWDM systems have different unit common costs.

Embodiments derive where to route the connections, which DWDM system to route, where to use unused subchannels of the existing multiplex links, where to create new multiplex links, where to place regenerator OTs, which wavelength to select, what is the total capital cost, etc., all of the information a network planner would like to know.

One aspect of the invention provides a method to find a diverse route through an optical network with minimal total estimated cost. Methods according to this aspect of the invention include defining the optical network comprising one or more subnetworks, acquiring each subnetwork's available wavelengths and wavelength bandwidth, for each subnetwork's network links, acquiring a detailed fiber route over fiber span network, assembling an optical network graph for the network, defining a service diversity requirement for the optical network graph, creating constraints for the optical network graph based on the service diversity requirement, creating an objective function for the service diversity requirement, and outputting one or more diverse routes satisfying the service diversity requirement wherein a diverse route in ROADM domains are physically diverse from each other with enough wavelength capacity and the total capital cost or the total distance is minimized.

Another aspect of the invention provides a method that provides all required information via post-processing the diverse routes. Methods according to this aspect of the invention include creating an auxiliary cost graph for each diverse route output, assigning edge weights for each auxiliary graph, selecting a shortest path based on the assigned edge weight, extracting the subnetwork selection, determining where to place one or more Optical Transponders (OTs), wherein the OTs include terminal OTs, multiplexing OTs and regenerator OTs, assigning a wavelength on each subnetwork link according to the subnetwork's specifications, and outputting total capital cost and mileage.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5 is an exemplary first diverse route auxiliary cost graph.

FIG. 7 is an exemplary variable table used in the Integer Linear Programming (ILP) method.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that implement a core DWDM routing tool in conjunction with a Graphic User Interface (GUI) to provision one or more physically diverse optical routes. A network planner can input information pertaining to a fixed number of optical routes, for example 10. Each optical route includes two end offices, its required capacity, and lists of nodes to be avoided or included. Additional metrics can specify minimizing total cost or distance, node or edge disjoint and the allowed maximal running time. Embodiments compute and show the near optimal routes over the heterogeneous systems, including the detail information about terminal OT and regenerator OT locations and wavelength assignment. The invention is a modular framework and is deployed as software as an application program tangibly embodied on a program storage device. The application code for execution can reside on a plurality of different types of computer readable media known to those skilled in the art.

Figure 1:
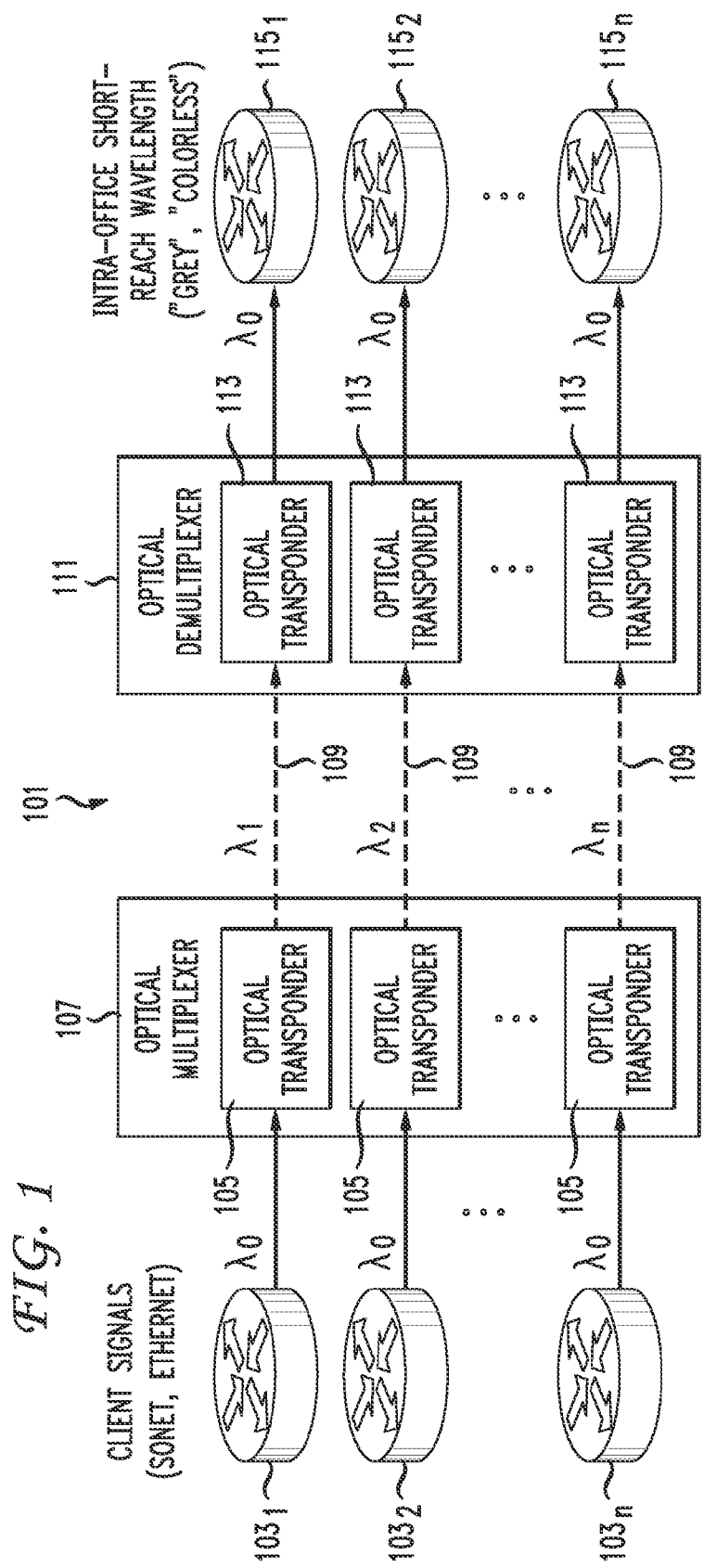
FIG. 1 is an exemplary point-to-point Dense Wavelength Division Multiplexing (DWDM) system.
Figure 2:
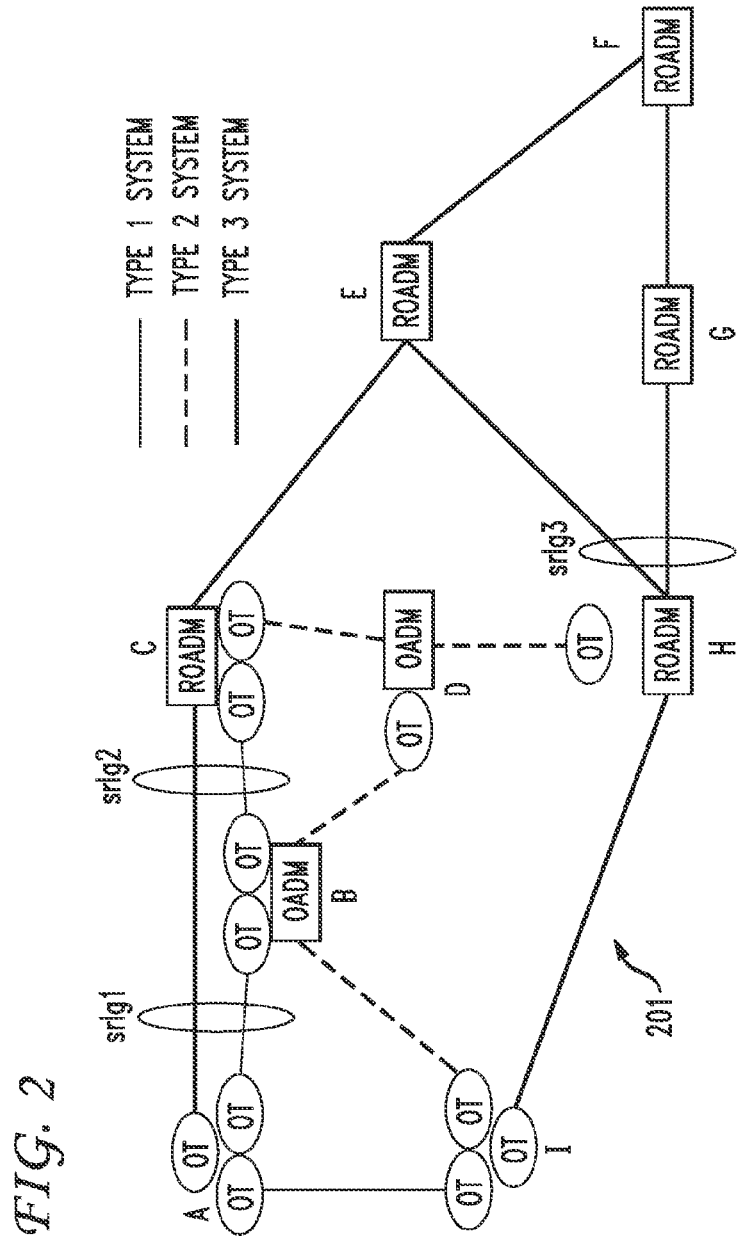
FIG. 2 is an exemplary optical transport communications network.

FIG. 2 shows an optical transport network 201 that comprises nine network offices A, B, C, D, E, F, G, H and I, fourteen DWDM links, and three types of Shared Risk Link Group (SRLG) systems. Multiple DWDM systems, for example, A-B and A-C, could share a partial route with DWDM A-C which does not add/drop traffic at office B.

DWDM links A-B, A-I and B-C are a Type 1 point-to-point DWDM system, DWDM links I-B, B-D, D-C and D-H are a Type 2 OADM system and DWDM links A-C, C-E, E-F, F-G, G-H, H-I, and E-H are a Type 3 ROADM system.

In a heterogeneous optical transport network, different types of systems can support different capacities per wavelength. For example, a Type 1 system only supports OC-48 per wavelength, a Type 2 system supports OC-48 and OC-192 per wavelength and a Type 3 system supports OC-768 per wavelength. Type 3 systems may also support a subwavelength/channel using demultiplexing, i.e., one wavelength can be demultiplexed into four OC-192 subchannels.

In OADM and ROADM systems, a wavelength can travel through multiple DWDM links without regeneration, which is referred to as reachability. For example, in FIG. 2, an optical signal can travel directly from office I to office D through office B on a Type 2 system. The reachability depends on fiber type, fiber distance and other physical characteristics which are provided by the system vendor via complicated measurement and computation. A long lightpath reachability feature can reduce route cost by saving regenerator OTs.

For ROADM systems with lightpath demultiplexing capability, a network may have existing multiplexed links with unused subchannels. Since demultiplexing OTs are present, no extra OT capital cost is required to use those unused subchannels. In diverse routing to minimize total cost, available subchannel usage should be considered.

Embodiments model an Integer Linear Programming (IPL) with mathematic formulation. Embodiments enable a network data model that comprises input parameters that represent an optical transport network and route specifications, and use decision variables and constraints to ensure a physically diverse routing.

Figure 3:
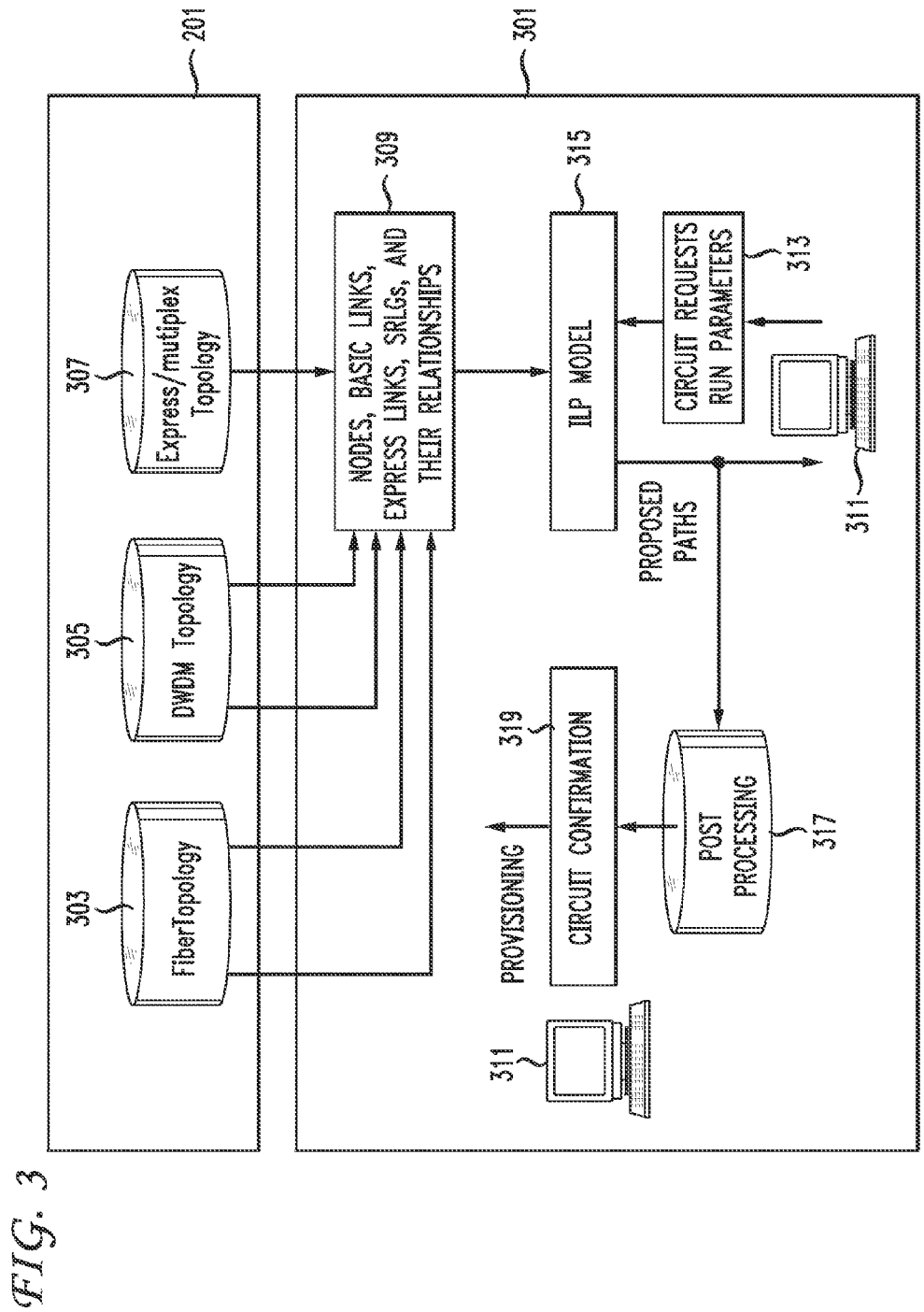
FIG. 3 is an exemplary system framework.
Figure 4B:
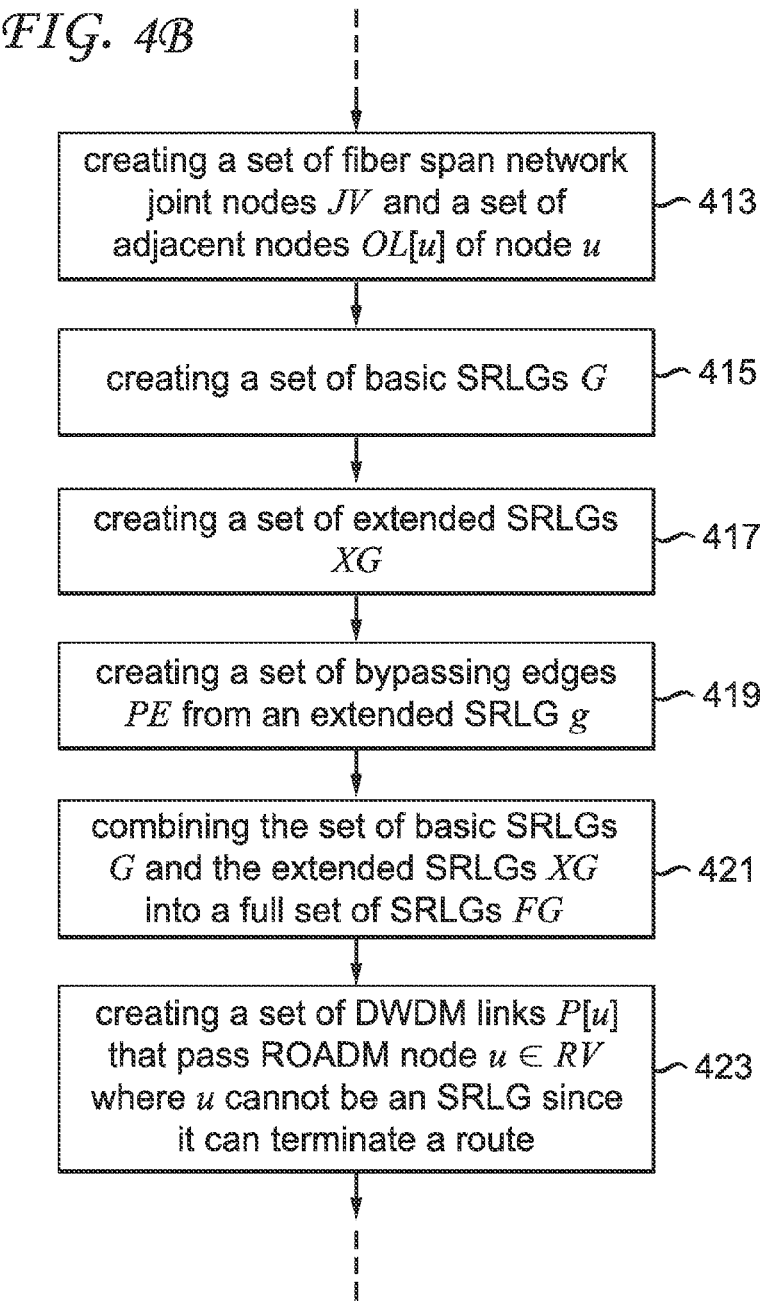
FIG. 4 is an exemplary two-step, physically diverse optical routing method.
Figure 4C:
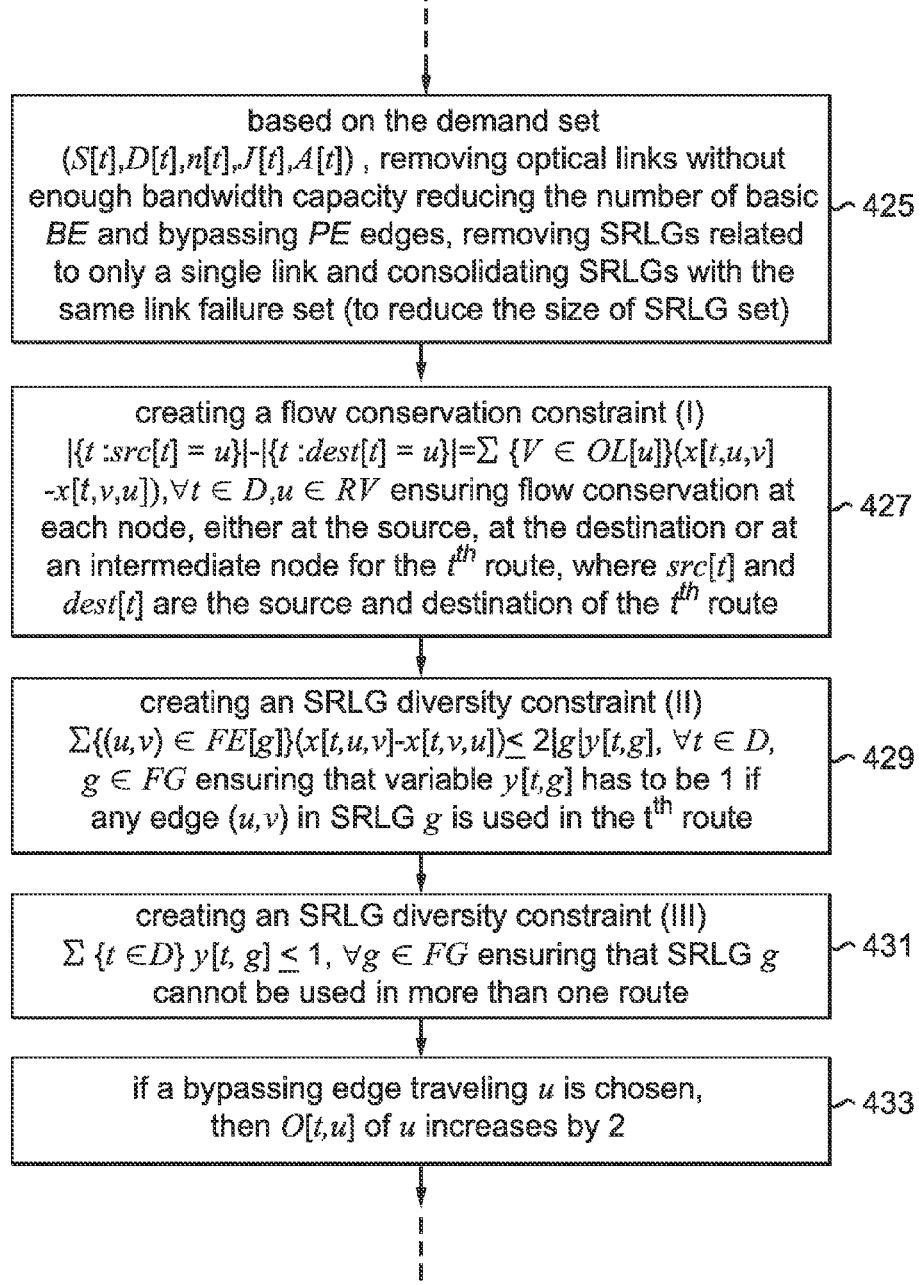
Figure 4D:
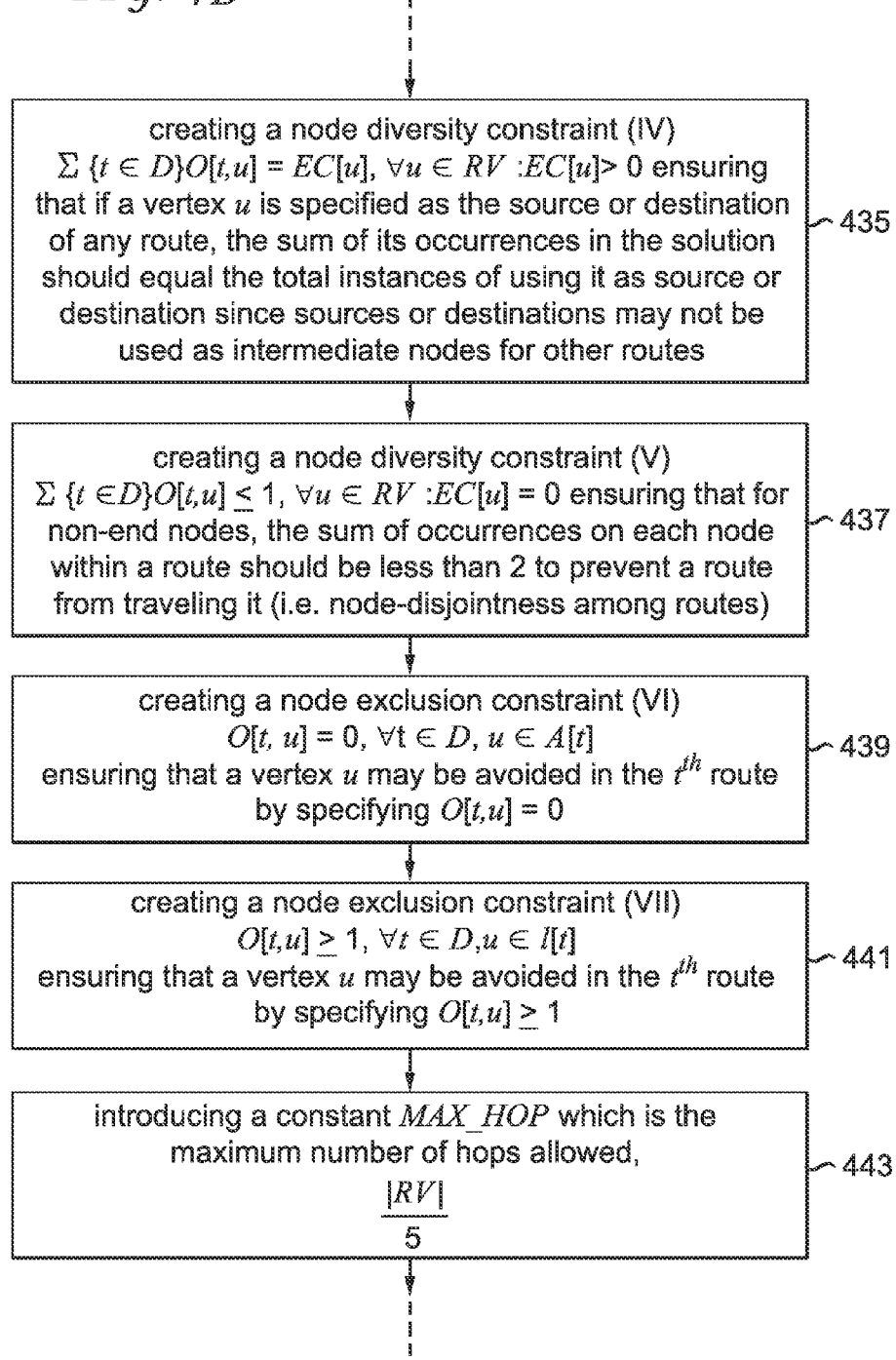
Figure 4E:
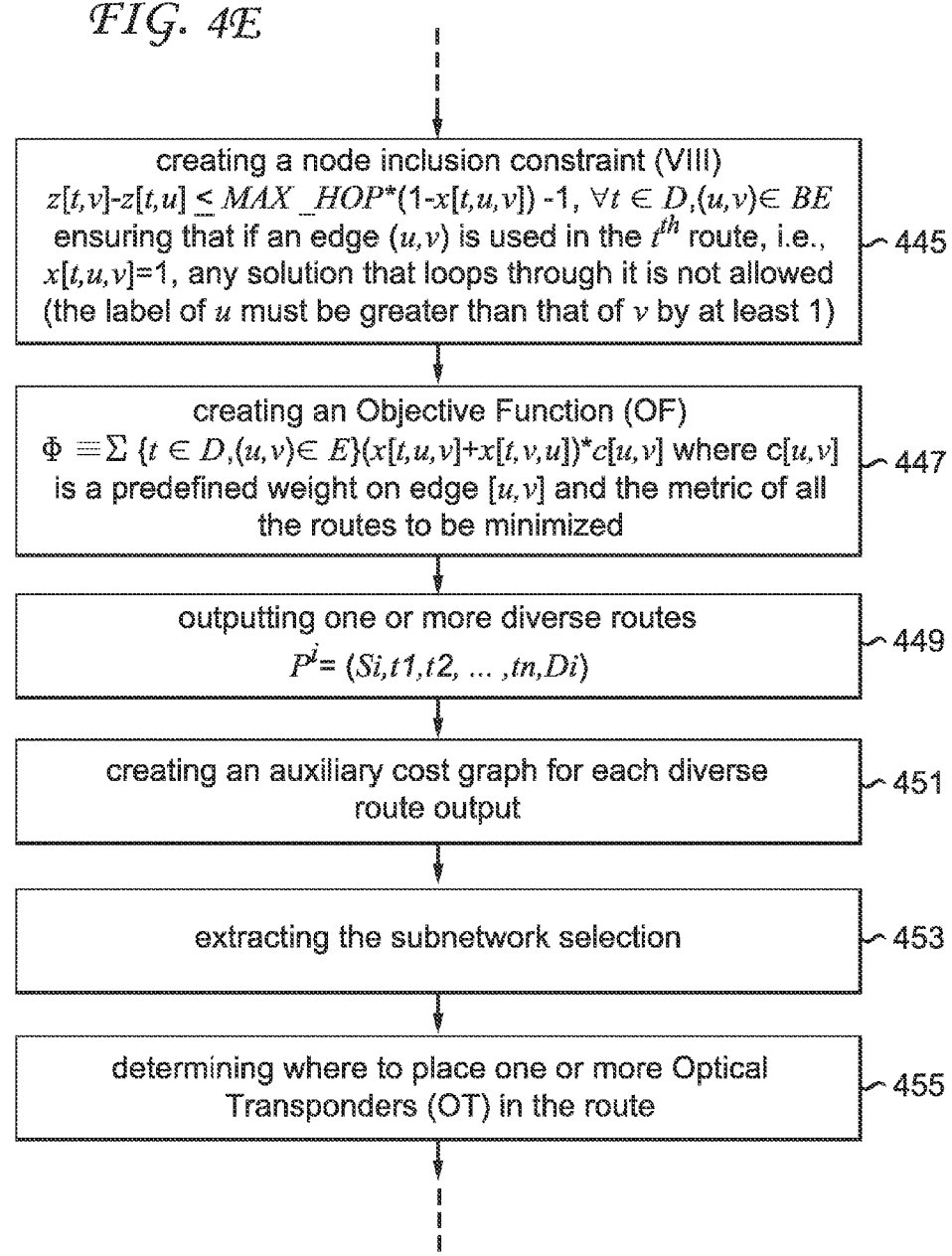
Figure 4F:
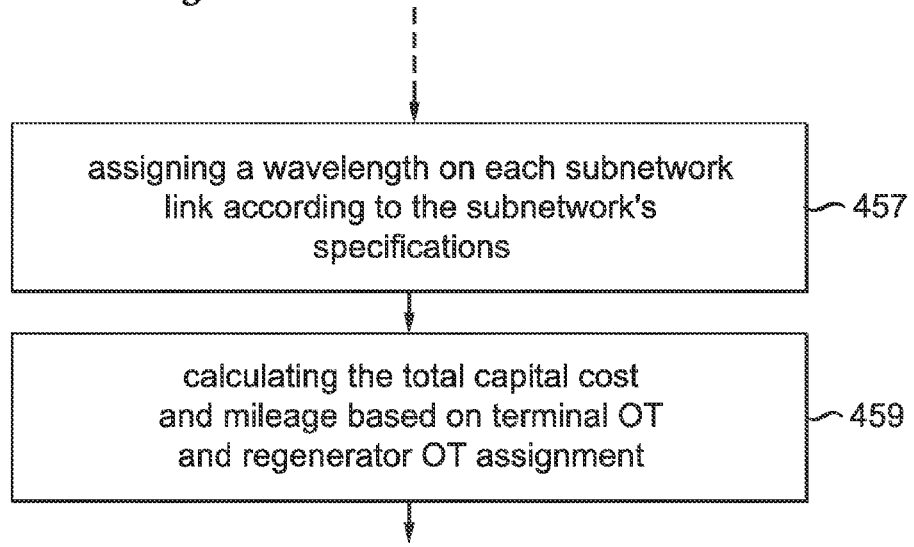

FIG. 3 shows an embodiment of a system framework 301 and FIG. 4 shows a method. The framework 301 may be part of a network management server and includes a network interface 309 coupled to a network 201 configured to acquire fiber topology data 303, DWDM topology data 305, express/multiplex topology data 307, network reachability data, as well as network status information to perform the two-step embodiments (step 401).

Embodiments assemble a network data model that comprises a list of DWDM links with distance, OC-48, OC-192 and OC-768 cost and a list of SRLGs that include fiber joint, ROADM node and fiber spans. For each SRLG, shared DWDM links are identified. DWDM links that bypass ROADM nodes are listed with their bypassing DWDM links. Express/multiplex links with distance and OC-48, OC-192 and OC-768 cost are listed. For each express/multiplex link, all of their DWDM links are listed (step 403). This network data model provides all of the information that the first step ILP requires to arrive at diverse routes.

Each subnetwork has its own available wavelength and wavelength bandwidth. For each optical network link, the detailed fiber route over fiber span network is given (step 405).

The network interface 309 is coupled to the network inventory databases 303, 305, 307, and an ILP model engine 315. The engine 315 is coupled to storage, memory and I/O (not shown).

The framework 301 may be implemented as a computer including a processor, memory, storage devices, software and other components. The processor is coupled to the network interface 309, I/O, storage and memory and controls the overall operation of the computer by executing instructions defining the configuration. The instructions may be stored in the storage device, for example, an optical or magnetic disk, and loaded into the memory when executing the configuration. The invention may be implemented as an application defined by the computer program instructions stored in the memory and/or storage and controlled by the processor executing the computer program instructions. The computer also includes at least one network interface 309 coupled to and communicating with a network 201 such as shown in FIG. 2 to interrogate and receive network configuration. The I/O allows for user interaction with the computer via peripheral devices 311 such as a display, a keyboard, a pointing device, and others.

A computer 311 allows for a user to input a service request 313 such as a source and destination, desired operational bandwidths, nodes to specifically traverse and nodes to specifically avoid. A set of user connection demands (mutual diverse routes) is specified by source, destination, bandwidth requirement, list of ROADM locations to be excluded and list of ROADM locations to be included, and the optimization objective of either minimum total cost or minimum total distance. The client service request is combined with the optical network G(N,E,R), a network inventory of N nodes, E links, and reachability information R. The user service diverse routing request is defined as a set of routes <S[t],D[t],n[t],I[t],A[t]>, for a $t^{th}$ source S[t], a $t^{th}$ destination D[t], a $t^{th}$ bandwidth size n[t], a $t^{th}$ list of included nodes I[t] and a $t^{th}$ list of excluded nodes A[t], and is input (step 407). An ILP optical network graph data model is assembled for the optical network (step 409).

Embodiments employ an ILP model to output a physically diverse routing. A given heterogeneous optical network comprises a set of technology specific all optical subnetworks. Each subnetwork comprises its own express links, multiplex links, terminal OT and regenerator OT cost, as well as common cost. An express link is defined as an optical signal path without regeneration, and a multiplex link is defined as a wavelength lightpath with a demultiplexer terminal OT at each end to support lower bandwidth connection services.

An ILP optical network graph data model is defined and represents a complicated optical transport network. Demand specifications, decision variables and constraints are defined to ensure physically-diverse routing. An objective function completes the ILP model.

FIG. 7 shows a table of notations used. While graph theory terms "edge" and "link" are used interchangeably, in ILP, edge is used for a network graph and link for the physical network.

An optical network graph is made up of a set of Basic Edges (BE) and by Passing Edges (PE). The full set of edges E is the combination of them, i.e., E=E∪PE. RV is defined as the set of ROADM nodes connecting edges in E.

As described above, it is possible that between two ROADM nodes, there could be multiple subnetwork links. If they are on the same fiber span route, the minimal distance and minimal OC48/OC192/OC768 are chosen in the network graph. If they are on different fiber span routes, for each fiber span route, a virtual node and two virtual edges (from the two ROADM nodes to the virtual node) are created in the optical network graph to distinguish them. One virtual edge represents the physical optical links and the other virtual edge has distance/OC48/OC192/OC768 values of zero. For example, to represent a physical link A-B in the optical network graph with an additional virtual node, a virtual node _A is created, and an edge between A-_A and _A-B is created. MV is defined as the set of virtual nodes (step 411).

JV is defined as the set of fiber span network joint nodes and OL[u] is defined as the set of adjacent nodes of node u (step 413).

Since optical network links are routed over the fiber span network, each fiber span failure or fiber span joint failure could cause multiple optical network links failures. This defines an SRLG. From the detailed route of each optical network link, the minimal set of fiber spans and joint nodes such that no two failures will cause the same set of network link failure is found. This set is called the basic SRLGs G.

Each basic SRLG g is related to a set of basic edges GE[g], i.e., the set of basic edges GE[g] shares the common potential failure g (step 415).

Similar to optical links routed over a fiber span network to form a basic SRLG set, the fact that express links and multiplex links routed over optical links can be used to form an extended SRLG set XG which is the minimal set of optical links such that no two optical links will cause the same set of express/multiplex links to fail. To reduce the problem size, the extended SRLG set XG does not include any optical link passing any basic SRLG (step 417). For any extended SRLG g, XE[g] is the set of bypassing edges PE shared the common extended SRLG g (step 419).

The basic SRLG set G and the extended SRLG set XG are combined into a full set of SRLGs FG≡G∪XG (step 421). For a basic or extended SRLG g∈FG, the edges FE[g] sharing the same risk g include the basic edges in GE[g] (or g itself as an extended SRLG), and those bypassing edges PE using any edge in GE[g] (or g).

In an optical network, an optical link may pass some ROADM nodes other than its ending nodes. For example, FIG. 2 shows DWDM system A-C passes office B. Such information also needs to be considered for diverse routing. For example, to provision two physically-diverse OC-192 routes, a pair of candidate routes, A-C and I-D, are not a feasible solution since in the DWDM link layer they both pass office B. Therefore, P[u] is defined as a set of DWDM links passing ROADM node u∈RV u cannot be treated as a fiber joint (an SRLG) since it can terminate a route (step 423). VE[u∈RV] may be derived as those basic BE or bypassing PE edges passing node u. This information is used to ensure node-disjointness or prevent loops in the ILP outputs. A loop is defined as a route crossing the same node more than once.

The user specifies a set of route demands. For the $t^{th}$ route, the user specifies the source S[t], destination D[t], bandwidth n[t], a set of ROADM nodes to be avoided A[t] as well as a set of ROADM nodes to be included I[t].

ILP is a computation-intensive approach. To accelerate the computation, the problem size needs to be reduced. From the bandwidth requirements of the demand set <S[t],D[t],n[t],I[t],A[t]>, the optical links without enough capacity may be removed to reduce the number of basic BE and bypassing PE edges. SRLGs related to only a single link may be removed and SRLGs related to a same link failure set may be consolidated to reduce the size of the SRLG set (step 425). x[t,u,v] is a binary variable to indicate if edge (u,v) is used in a $t^{th}$ route and y[t,g] is a binary variable to indicate if SRLG g∈FG is used in the $t^{th}$ route.

A flow conservation constraint, $$|\{t:S[t]=u\}|-|\{t:D[t]=u\}|=\Sigma\{V\in OL[u]\}(x[t,u,v]-x[t,v,u]), \forall t, u\in RV, \quad (I)$$

ensures flow conservation at each node, at the source, at the destination, or at an intermediate node for the $t^{th}$ route, where S[t] and D[t] are the source and destination of the $i^{th}$ route respectively (step 427). For example, if u is the source node of the $t^{th}$ route, then for one of its neighbor nodes v, the link (u,v) will be chosen on the solution route, i.e., x[t,u,v]=1.

Two constraints provide SRLG diversity, $$\Sigma\{(u,v)\in FE[g]\}(x[t,u,v]+x[t,v,u])\leq 2|g|y[t,g], \forall t, g\in FG \quad \text{and} \quad (II)$$

$$\Sigma\{t\in D\}y[t,g]\leq 1, \forall g\in FG. \quad (III)$$

Constraint II ensures that variable y[t,g] is 1 if any edge (u,v) in SRLG g is used in the $t^{th}$ route (step 429). If y[t,g] is 0, then no edge (u,v) in SRLG g can be used in the $t^{th}$ route. Constraint III ensures that SRLG g cannot be used in more than one route (step 431), i.e., up to one y[t,g] can be 1.

For node disjoint constraints, O[t,u] is defined to represent the number of links containing vertex u in the solution routes. If a bypassing edge traveling u is chosen, then O[t,u] of u increases by a value of two (step 433).

The definition of O[t∈D,u∈RV]≡ is $$\Sigma\{v\in OL[u]\}(x[t,u,v]+x[t,v,u])+2\Sigma\{(u',v')\in VE[u]\}(x[t,u',v']+x[t,v',u'])$$

when u∈RV, or $$\Sigma\{v\in OL[u]\}(x[t,u,v]+x[t,v,u])+2\Sigma\{(u',v')\in VE[u]\}(x[t,u',v']+x[t,v',u'])+\Sigma\{v\in OL['\_'\&u]\}(x[t,'\_'\&u,v]+x[t,v,'\_'\&u])+2*\Sigma\{(u',v')\in VE['\_'\&u]\}(x[t,u',v']+x[t,v',u'])-2*(x[t,u,'\_'\&u]+x[t,'\_'\&u,u])$$

when u∈MV. '_'&u represents the virtual node of u by adding a prefix of '_'.

The definition O[t,u∈RV] combines the occurrences of a virtual node into that of its corresponding ROADM node but excludes the virtual link between the ROADM node and its virtual node.

$$\Sigma_t O[t,u]=EC[u], \forall u\in RV:EC[u]>0 \text{ and} \quad (IV)$$

$$\Sigma_t O[t,u]\leq 1, \forall u\in RV:EC[u]=0, \quad (V)$$

where EC[u]≡|{t:S[t]=u}|+|{t:D[t]=u}| is the number of times vertex u is the source or destination for all the routes. Constraint IV ensures that if vertex u is specified as the source or destination of any route, the sum of its occurrences in the solution should equal the total instances of using it as source or destination since network planners would not allow sources or destinations to be used as an intermediate node for other routes (step 435).

For non-end nodes, Constraint V shows the sum of occurrences should be less than 2 to prevent more than one route from traveling it (i.e. node-disjointness among routes) (step 437).

A node exclusion constraint, $$O[t,u]=0, \forall t, u\in A[t], \quad (VI)$$

ensures that vertex u is avoided in the $t^{th}$ route (step 439).

A node inclusion constraint, $$O[t,u]\geq 1, \forall t, u\in I[t], \quad (VII)$$

ensures that vertex u is included in the $t^{th}$ route (step 441).

Enforcing node inclusion introduces a new issue in the ILP formulation—the unadjusted ILP may return an invalid solution. For example, for a route from A to B to include C, the ILP may return a path A to B, and a separate loop containing C. If there is no requirement on node inclusion, a false solution can be avoided automatically since the solution without the loop has a lower/better objective value.

To prevent an invalid solution, a label variable for each vertex z[t,u] is used if an edge from u→v is selected for route t, the label variable value z[t,v] must be 1 smaller than label variable value z[t,u], otherwise the two values have no relationship.

To satisfy this constraint, a constant MAX_HOP is introduced which is the maximum number of hops allowed. One value of MAX_HOP could be the number of ROADM nodes. To accelerate ILP computation, $$\frac{|RV|}{5}$$

is normally used as the default (step 443).

$$z[t,v]-z[t,u] \leq MAX\_HOP*(1-x[t,u,v])-1, \forall t,(u,v) \in BE \quad (VIII)$$

ensures that if edge (u,v) is used in the $t^{th}$ route, i.e., x[t,u,v]=1, the label of u must be greater than that of v by at least one. Therefore, any solution with loops is not allowed (step 445).

An Objective Function (OF) is created, $$\Phi = \Sigma\{t \in D, (u,v) \in E\}(x[t,u,v]+x[t,v,u])*c[u,v], \quad (OF)$$

where c[u,v] is a user defined weight on edge [u,v]. The user can choose the metric of all the routes to be minimized, therefore, c[u,v] could be the cost of allocating one channel on [u,v] to minimize total capital cost, or geographical distance of [u,v] to minimize total distance, or 1 unit to minimize total hop number (step 447).

The diverse route with minimized cost or minimized distance (shortest path) through the network is output from the ILP, i.e., the set of Boolean values (true or false) to show if edge [u,v] is chosen on the $t^{th}$ route (step 449).

In the second step, the data is input to a post processor 317 to further optimize vendor system selection, regenerator OT placement and wavelength assignment using an auxiliary cost graph for each selected route. The final results are reviewed and confirmed by planners 319 and sent for field provisioning.

For each diverse route output $P^i$<Si,t1,t2, . . . , tn, Di>, a corresponding auxiliary cost graph $G^i(V^i,E^i)$ is created (step 451). For each office location k in path $P^i$, the number of system types terminating at k are found, $N_k$. $N_k$+1 vertices in $V^i$ are created, one vertex for the real traffic termination and $N_k$ vertices for the $N_k$ system types. Here system type includes subnetwork types and multiplex link types. $N_k$ edges are created from the traffic termination vertex to each of the $N_k$ (system type) vertices with a cost of $$OT\ COST - \frac{regen\ COST}{2}.$$

The edge cost is non-negative since one half regenerator OT cost should be less than one terminal OT cost of the same system type for any optical network link with sufficient capacity, including DWDM links and regenerator OT free express links, as well as 0 for multiplexing links. If an edge is inside path $P^i$, the specific system type and its two end office locations from $V^i$ are identified. The corresponding two system type vertices are located and one edge between them is created whose cost is the sum of one regenerator OT cost plus its common cost for DWDM links and express links while multiplex link cost for multiplexing links.

The shortest path is then found using the auxiliary cost graph from source to destination for route $P^i$. Intercity edges on the shortest path identify the subnetwork selected since each intercity edge corresponds to one specific network link, and each network link only belongs to one subnetwork (step 453).

Each intercity edge on the shortest path corresponds to one DWDM link, or express link, or multiplexing link. If two consecutive links belong to the same subnetwork, a regenerator OT is placed on the common node location. If two consecutive links belong to different subnetworks, one terminal OT of each subnetwork is required on the common node to connect the two subnetworks. At the two ends of the route, two terminal OTs are needed, one on each side with the corresponding subnetwork (step 455).

For each DWDM link, express link, and multiplexing link, wavelengths are assigned according to the corresponding subnetwork wavelength assignment constraint policies, such as a first-fit policy, i.e., order the wavelengths according to frequency and assign available wavelengths from the lower order to the high order (step 457).

According to the terminal OT and regenerator OT assignment above, real capital cost may be calculated for the route and the result output to a user (step 459).

For example, the ILP model outputs two diverse routes from A to F for the network shown in FIG. 2: A-C-E-F over OC-192 (FIG. 5) and A-I-H-G-F (FIG. 6) over OC-48. For the first route A-C-E-F, an auxiliary cost graph is created by finding a subnetwork G1(V,E), where V is the set of nodes of {A, C, E, F}. E is the set of DWDM sections of {A-C, C-E, E-F} with available OC-192 channels.

FIG. 5 shows an auxiliary cost graph 501 of the first route over subnetwork 503. There are eight nodes and nine edges, where broken lines (edges) indicate express links. An edge weight for A-A3, C-C3, E-E3 and F-F3 is assigned as the terminal OT cost minus one half of the regenerator OT cost of a Type 3 system. All of the remaining edges are assigned the weight of one regenerator OT cost. If the smallest cost path selected is A-A3-E3-F3-F, (or smallest cost path A-A3-C3-F3-F), which means the optical signal will bypass ROADM C and be regenerated at ROADM E. The total OT cost would be two terminal OT cost plus one regenerator OT cost. On links AE and EF, the first available wavelength will be selected.

Figure 6:
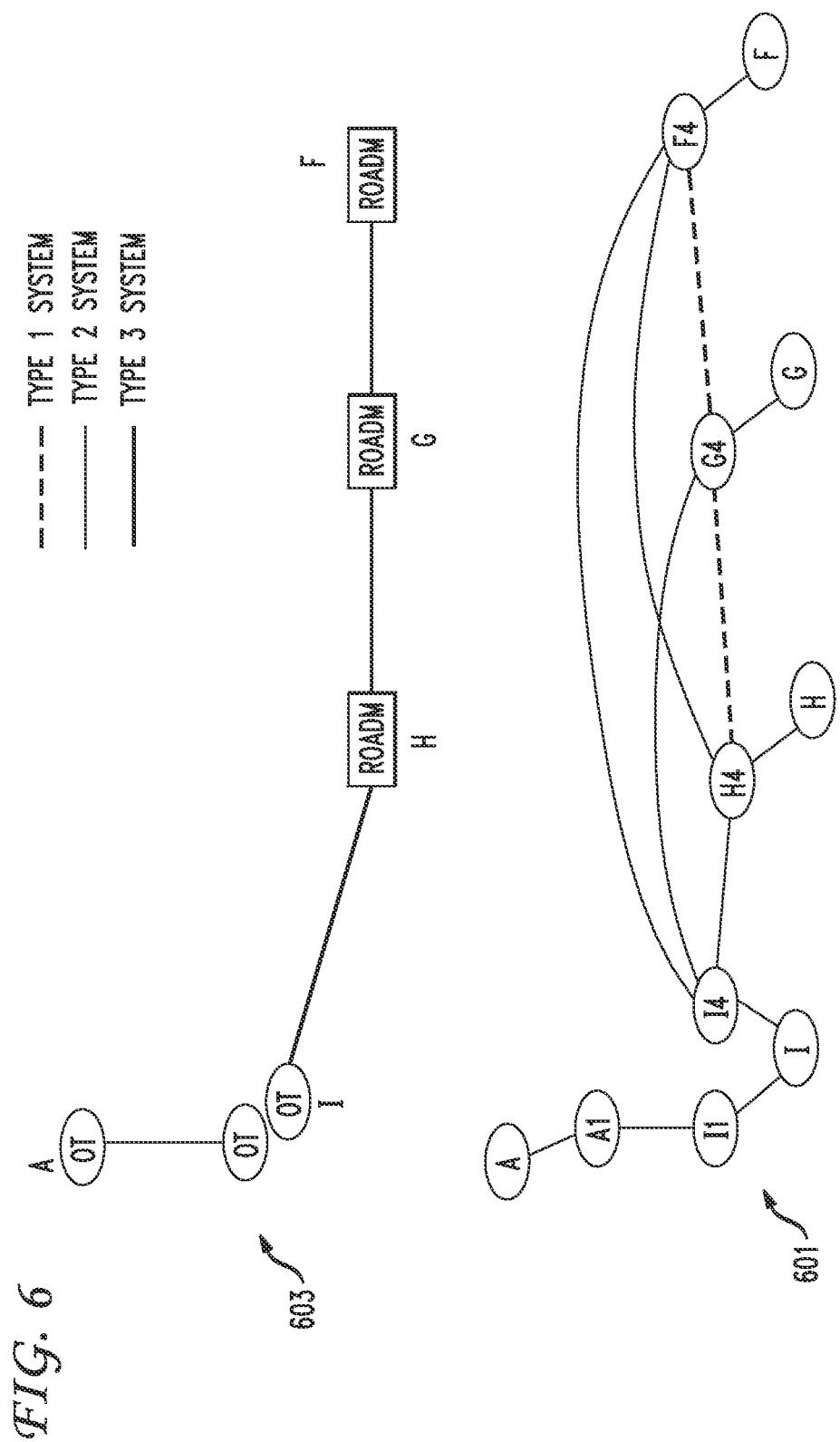
FIG. 6 is an exemplary second diverse route auxiliary cost graph.

FIG. 6 shows an auxiliary cost graph 601 of the second route over subnetwork 603. There are eleven nodes and thirteen edges for route A-I-H-G-F over an OC-48 route. All DWDM links and express links that do not reside on this route are removed and a subnetwork with links is generated along this route. At office A, there is only one system type, Type 1, so there is node A and A1. Since Type III systems do not support OC-48 directly, OC-192 multiplex is used to support OC-48. In this case, office I has two system types: Type 1 and Type 3 multiplex. At office H, G and F, each has one system type: Type 3 multiplex. From office I, there may be OC-192 multiplex routes to office H, G and F. From office H, there may be OC-192 multiplex circuits to office G and F. From office G, there may be one OC-192 multiplex circuit to office F. For each OC-192 multiplex route over the subnetwork, the total optical OT cost and common cost may be obtained. Therefore, edge A-A1 and edge I-I1 have weights of one terminal OT cost minus one half regenerator OT cost of a Type 1 system. Edges I-I4, H-H4, G-G4 and F-F4 have a weight of zero. Edge A1-I1 has a weight of one regenerator OT cost of a Type 1 system. Edges I4-H4, I4-G4, I4-F4, H4-G4, H4-F4 and G4-H4 have their real regenerator OT costs and common costs.

After the shortest path from A to F over the second route auxiliary graph, regenerator OT placement at each node of the shortest path and first-fit wavelength assignment for each link of the shortest path may be obtained. For example, if the shortest path is A-A1-I1-I-I4-F4-F, a wavelength over system A-I of a Type 1 system and a subchannel of the OC-192 multiplex route I-H-G-F may be used, which includes regenerator OT placement and wavelength assignment.

For a real case of provisioning three physically diverse OC-48 routes in a larger commercial heterogeneous optical network, the resulting ILP instance has 315 non-redundant SRLGs, 1,246 express edges, 15,297 Boolean (0 and 1) variables and 4,765 constraints. Solving the ILP instance with an open source ILP solver such as GNU MathProg Language (GMPL)/Cbc 2.2.2 requires less than 10 seconds on a 2.4 GHz Intel Xeon CPU, which is fast enough for real-time interaction with network planners. The computation time can be even less using commercial ILP solvers.

By using the two-step embodiments, real-time, cost effective and physically diverse routing may be computed over complicated heterogeneous core DWDM networks. Embodiments enable a network planner to make more informative and intelligent decisions and significantly save a network carrier's capital cost.

One or more embodiments of the present invention have been described. Nevertheless, it will be understood that various modifications may be made without departing from the spirit and scope of the invention. Accordingly, other embodiments are within the scope of the following claims.

What is claimed is:

1. A method to find a diverse route through an optical network with minimal total estimated cost comprising:
    defining the optical network comprising one or more subnetworks;
    acquiring each subnetwork's available wavelengths and wavelength bandwidth;
    for each subnetwork's network links, acquiring a detailed fiber route over fiber span network;
    assembling, by a processor, an optical network graph for the network;
    defining, by a processor, a service diversity requirement for the optical network graph;
    creating, by the processor, constraints for the optical network graph based on the service diversity requirement;
    creating, by the processor, an objective function for the service diversity requirement; and
    outputting, by the processor, one or more diverse routes satisfying the service diversity requirement wherein a diverse route in ROADM domains are physically diverse from each other with enough wavelength capacity and a total capital cost or a total distance is minimized.

2. The method according to claim 1 wherein the service diversity requirement further comprises defining a set of routes <S[t], D[t], n[t],I[t], A[t]>, for a $t^{th}$ source S[t], a $t^{th}$ destination D[t], a $t^{th}$ bandwidth size n[t], a $t^{th}$ list of included nodes I[t], and a $t^{th}$ list of excluded nodes A[t], and an optimization objective of either minimum total cost or minimum total distance.

3. The method according to claim 2 wherein the optical network graph further comprises:
    creating a set of basic edges BE representing optical network graph links;
    creating a set of basic Shared Risk Link Groups (SRLGs) G;
    creating a set of extended SRLGs XG;
    creating a set of bypassing edges PE representing express links and multiplex links;
    creating virtual nodes MV in the optical network graph when there are more than one subnetwork links between two ROADM nodes along different fiber routes;
    creating bypassing nodes inside DWDM links; and
    optimizing the optical network graph.

4. The method according to claim 3 wherein each SRLG g is related to a set of basic edges GE[g], and the set of basic edges GE[g] shares a common potential failure g.

5. The method according to claim 3 further comprising creating the set of bypassing edges PE from an extended SRLG g.

6. The method according to claim 5 further comprising combining the set of basic SRLGs G and the set of extended SRLGs XG into a full set of SRLGs FG.

7. The method according to claim 6 further comprising creating a set of DWDM links P[u] that a pass ROADM node u∈RV where u cannot be an SRLG since it can terminate a route.

8. The method according to claim 3 wherein the objective function further comprises defining an edge weight as the metric of all the routes to be minimized wherein the weight may be one of, the cost of allocating one channel to minimize total capital cost, or geographical distance to minimize total distance, or one unit to minimize total hop number.

9. The method according to claim 3 wherein optimizing the optical network graph further comprises:
    based on the service diversity requirement <S[t],D[t],n[t], I[t],A[t]>:
        removing optical links without enough bandwidth capacity reducing the number of basic BE and bypassing PE edges;
        removing SRLGs related to only a single link; and
        consolidating SRLGs with the same link failure set.

10. The method according to claim 3 wherein creating constraints further comprises:
    creating a flow conservation constraint;
    creating SRLG diversity constraints;
    creating node diversity constraints;
    creating a node exclusion constraint; and
    creating node inclusion constraints.

11. The method according to claim 10 wherein creating a flow conservation constraint further comprises ensuring flow conservation at each node, at the source S[t], at the destination D[t], or at an intermediate node for the $t^{th}$ route.

12. The method according to claim 10 wherein creating SRLG diversity constraints further comprises ensuring that if any SRLG g edge is used in the $t^{th}$ route, then no edge in SRLG g can be used in the $t^{th}$ route.

13. The method according to claim 10 wherein creating SRLG diversity constraints further comprises ensuring that an SRLG g cannot be used in more than one route.

14. The method according to claim 10 wherein creating node diversity constraints further comprises ensuring that if a vertex u is specified as the source or destination of any route, the sum of its occurrences should equal the total instances of using it as source or destination since the source or destination may be used as intermediate nodes for other routes.

15. The method according to claim 10 wherein creating node diversity constraints further comprises ensuring that for non-end nodes, the sum of occurrences on each node within a route should be less than 2 to prevent a route from traveling it.

16. The method according to claim 10 wherein creating a node exclusion constraint further comprises ensuring that a vertex u may be avoided in the $t^{th}$ route.

17. The method according to claim 10 wherein creating node inclusion constraints further comprises ensuring that a vertex u may be included in the $t^{th}$ route.

18. The method according to claim 10 wherein creating node inclusion constraints further comprises ensuring that if an edge (u,v) is used in the $t^{th}$ route, any solution that loops through it is not allowed.

19. The method according to claim 1 further comprising post processing the one or more physical diverse routes.

20. The method according to claim 19 wherein post processing further comprises:

creating an auxiliary cost graph for each diverse route output;

assigning edge weights for each auxiliary graph;

selecting a shortest path based on the assigned edge weight;

extracting the subnetwork selection;

determining where to place one or more Optical Transponders (OTs), wherein the OTs include terminal OTs, multiplexing OTs and regenerator OTs;

assigning a wavelength on each subnetwork link according to the subnetwork's specifications; and calculating total capital cost and mileage.

21. The method according to claim 20 wherein cost includes common cost and OT cost.

22. The method according to claim 21 wherein common cost includes shared Dense Wavelength Division Multiplexer (DWDM) system cost, optical amplifier cost and fiber cost, and is the product of unit cost per distance and total distance.

23. The method according to claim 22 further comprising considering the cost difference between terminal OTs and regenerator OTs.

* * * * *